United States Patent

[11] 3,614,015

[72] Inventor Irving Sussman
540 E. 80th St., Brooklyn, N.Y. 11236
[21] Appl. No. 875,299
[22] Filed Nov. 10, 1969
[45] Patented Oct. 19, 1971

[54] EASY-LOADING FISHING REEL
10 Claims, 3 Drawing Figs.
[52] U.S. Cl. .................................................. 242/84.1 R
[51] Int. Cl. ............................................................ A01k 89/00
[50] Field of Search........................................... 242/84.1,
84.1 K, 129.51, 68.1

[56] References Cited
UNITED STATES PATENTS
2,669,399   2/1954   Wood............................ 242/84.1 K X
3,506,213   4/1970   Young............................ 242/84.1 R Primary Examiner—Billy S. Taylor
Attorney—Friedman & Goodman ABSTRACT: A fishing reel is provided with a detachable spool about which the line is wound and unwound whereby spool and line can be removed and replaced with another spool and line as desired. The fishing reel includes a cylindrical cage provided with a pair of oppositely disposed rotatable parallel-spaced wheels. The wheels are provided with radially extending opposite slots to receive transversely extending flanges provided on opposite ends of the spool to detachably secure the spool to and between the wheels whereby the spool and wheels rotate together to wind and unwind the line. Preferably, catches at opposite ends of the cage hold the flanges in their associated slots. The cage may be provided with elements for aligning the wheels to maintain the slots in aligned parallel positions for easy insertion and removal of the spool.

PATENTED OCT 19 1971 3,614,015
FIG. 3
FIG. 1
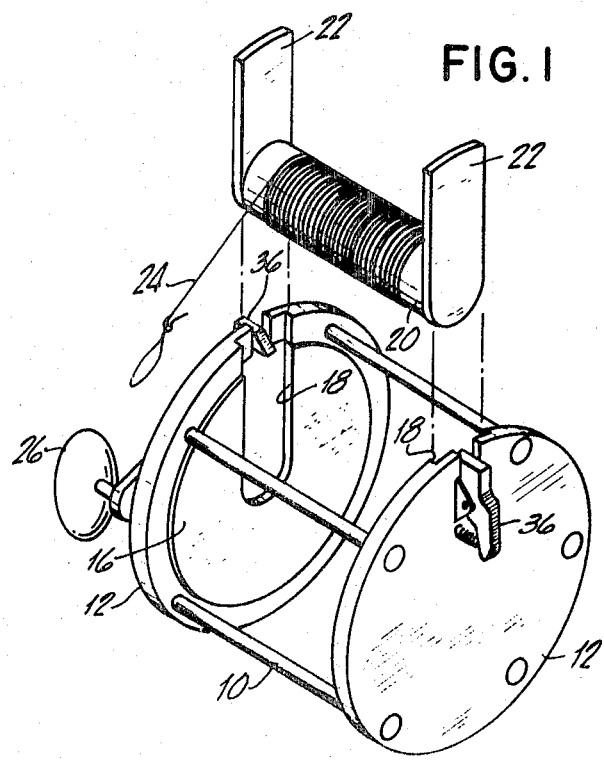
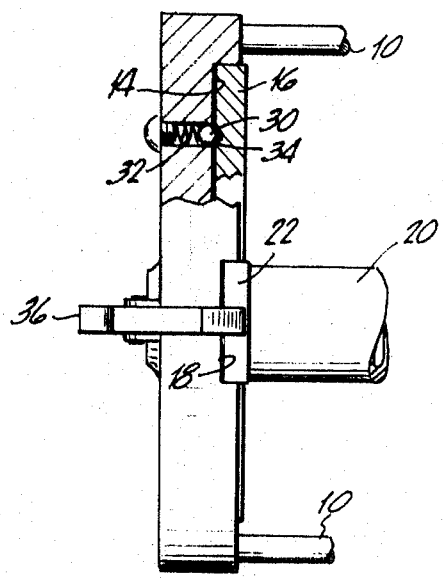
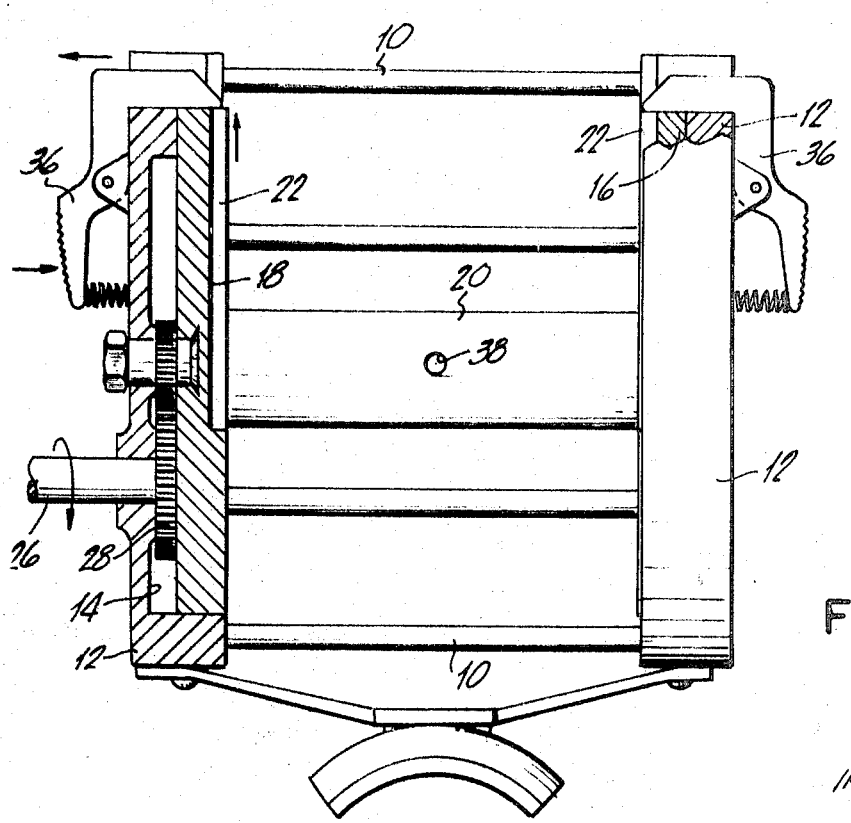
FIG. 2
INVENTOR
IRVING SUSSMAN

EASY-LOADING FISHING REEL

SUMMARY OF THE INVENTION

A fishman using a rod with a conventional reel secured thereto and carrying a line may wish to change the line for another line of different length, thickness or otherwise having different properties. In order to change the line he must either remove the reel and line to replace same with another reel carrying the desired line or must unwind the original line from the original reel and then wind the other line thereon. Both procedures are time consuming, and, since reels are expensive, many fishermen cannot afford to own more than one.

In my invention, only one reel is used. However, the reel has an inexpensive spool or drum with a line thereon which is used to wind and unwind the line. The reel is so constructed that the spool and line can be easily removed and replaced or reinstalled. Consequently, a fisherman can have a plurality of inexpensive spools, each carrying its own line, for use with one and the same reel whereby lines can be quickly and easily removed and replaced as required.

BRIEF DESCRIPTION OF THE DRAWINGS

In the drawings
FIG. 1 is a perspective view of my invention;
FIG. 2 is an enlarged side view thereof; and
FIG. 3 is an enlarged detail view thereof.

DETAILED DESCRIPTION OF PREFERRED EMBODIMENTS

Referring now to FIGS. 1-3, a hollow open cylindrical cage 10 has opposite ends 12 having recesses 14 in which corresponding wheels 16 are rotatably disposed. Each wheel has a radial slot 18. When these slots are aligned, a spool 20 having transverse flanges 22 can be positioned between the wheels as an axle with each flange 22 engaging a corresponding slot 18. Each spool is wound with its own line 24. Crank 26 rotates gearing 28 which in turn rotates one of wheels 16 whereby the line can be wound and unwound. The reel wheels automatically line themselves up with aligned slots with balls 30 spring loaded at 32 forcing themselves into corresponding slots 34 in the wheels.

Spring-loaded catches 36 one at each end of the cage bear removably against the free ends of the flanges to hold the spool detachably in position. The spool can have a transverse bore 38 into which the line can be inserted for securing same.

Thus by operating catches 36 spools with lines can be removably secured and released quickly and easily as previously described.

While I have described my invention with particular reference to the drawings, such is not to be considered as limiting its actual scope.

Having thus described this invention, what is claimed as new is:

1. In a fishing reel:
   a cylindrical cage;
   a pair of oppositely disposed rotatable parallel-spaced wheels in said cage;
   a spool having a fishing line wound thereon; and
   means detachably securing said spool to and between said wheels as an axle therefor, said spool being secured to said wheels whereby the spool and wheels rotate together to wind and unwind the line, said means including slots in said wheels extending radially therein and transversely extending flanges on opposite ends of the spool, each flange fitting detachably in the corresponding slot in the corresponding wheel.

2. A reel as set forth in claim 1 further including catches at opposite ends of said cage, each catch being adapted to detachably hold a corresponding flange in a corresponding radial slot.

3. A reel as set forth in claim 1 provided with additional means for aligning said wheels to maintain said slots in aligned parallel positions at all times for easy insertion and removal of said spool.

4. A fishing reel comprising a cage, first and second members rotatably disposed in said cage, said first member being rotatable with respect to said second member and being spaced in a parallel manner from said second member, a spool for winding fishing line thereon, first means disposed on said spool for engagement with said first and second members to position said spool between said first and second members to define an axle therefor, second means disposed on said first and second members for detachably securing said spool to said first and second members to permit said spool and said first and second members to rotate together, and crank means disposed on said cage adjacent to said first member for rotating said first member to wind and unwind the fishing line, said first and second means cooperating together to allow said spool with the fishing line thereon to be received and removed from between said first and second members.

5. A fishing reel according to claim 4, wherein said second means includes recess means in said first and second members to receive said first means of said spool.

6. A fishing reel according to claim 5, wherein said recess means define slots, said slots extending radially in said first and second members to receive said first means of said spool.

7. A fishing reel according to claim 6, wherein said first means of said spool includes transversely extending flanges disposed on opposite ends of said spool, each flange fitting detachably in its associated slot in its corresponding member.

8. A fishing reel according to claim 4, wherein said cage includes opposite end portions, said end portions being provided with recess means to rotatably receive said first and second members.

9. A fishing reel according to claim 4, wherein catch means are disposed at opposite ends of said cage to detachably hold said spool between said first and second members with said first and second means coacting to permit winding and unwinding of the fishing line on said spool.

10. A fishing reel according to claim 4, wherein said cage includes means for aligning said first member with respect to said second member to position said second means for cooperation with said first means to allow said spool to be received and removed from between said first and second members.